(12) United States Patent
Lee et al.

(10) Patent No.: US 12,546,661 B2
(45) Date of Patent: Feb. 10, 2026

(54) APPARATUS, METHOD, AND COMPUTER-READABLE RECORDING MEDIUM FOR MEASURING TEMPERATURE OF OBJECT USING COMPENSATION OF BOARD TEMPERATURE

(71) Applicant: U ELECTRONICS CO., LTD., Suwon-si (KR)

(72) Inventors: Joon-Sub Lee, Seoul (KR); Tae-Hwan Eom, Hwaseong-si (KR); Min Kyu Lee, Suwon-si (KR)

(73) Assignee: U ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 18/265,834

(22) PCT Filed: Dec. 9, 2020

(86) PCT No.: PCT/KR2020/017957
§ 371 (c)(1),
(2) Date: Jun. 7, 2023

(87) PCT Pub. No.: WO2022/124442
PCT Pub. Date: Jun. 16, 2022

(65) Prior Publication Data
US 2024/0027276 A1 Jan. 25, 2024

(30) Foreign Application Priority Data
Dec. 8, 2020 (KR) ........................ 10-2020-0170066

(51) Int. Cl.
*G01J 5/48* (2022.01)
*G01J 1/44* (2006.01)
(Continued)

(52) U.S. Cl.
CPC . *G01J 5/48* (2013.01); *G01J 1/44* (2013.01); *G01J 5/06* (2013.01); *G01J 5/52* (2013.01);
(Continued)

(58) Field of Classification Search
CPC .... G01K 15/00; G01K 15/002; G01K 15/005; G01K 1/00; G01K 7/42; G01J 5/48;
(Continued)

(56) References Cited

U.S. PATENT DOCUMENTS 6,515,285 B1 * 2/2003 Marshall ............... H01L 25/042
250/339.04
2003/0160171 A1 8/2003 Parrish et al.
(Continued)

FOREIGN PATENT DOCUMENTS

| | | |
|---|---|---|
| CN | 102346074 B | 8/2012 |
| CN | 102564599 B | 4/2013 |

(Continued)

*Primary Examiner* — Kristina M Deherrera
*Assistant Examiner* — Gilbert Bernard Shuster
(74) *Attorney, Agent, or Firm* — The Webb Law Firm (57) ABSTRACT

An apparatus for measuring temperature of an object using compensation of board temperature may include an infrared light sensor module for providing output voltage due to the infrared light emitted by an object; a board temperature compensation module for compensating the provided output voltage to the output voltage at the reference configuration temperature of the board using a first function of output voltage to board temperature obtained at a reference configuration temperature of a blackbody; and a calculation module for obtaining the temperature of the object from the compensated output voltage using a second function of temperature of the blackbody to the output voltage obtained at a reference configuration temperature of the board.

9 Claims, 5 Drawing Sheets

(51) Int. Cl.
*G01J 5/06* (2022.01)
*G01J 5/52* (2022.01)
*H04N 23/23* (2023.01)

(52) U.S. Cl.
CPC ........ *H04N 23/23* (2023.01); *G01J 2001/444* (2013.01)

(58) Field of Classification Search
CPC ........ G01J 1/44; G01J 5/06; G01J 5/52; G01J 2001/444; G01J 5/064; G01J 2005/0077; G01J 5/53; G01J 5/80; H04N 23/23
USPC .......................................................... 374/128
See application file for complete search history.

(56) References Cited

U.S. PATENT DOCUMENTS

| | | | |
|---|---|---|---|
| 2006/0262829 A1 | 11/2006 | Manlove et al. | |
| 2007/0183475 A1* | 8/2007 | Hutcherson | G01J 5/16 374/120 |
| 2010/0288915 A1* | 11/2010 | Endo | G01J 5/20 250/252.1 |
| 2014/0231651 A1* | 8/2014 | Kim | G01J 1/46 250/349 |
| 2017/0089764 A1 | 3/2017 | Lee et al. | |
| 2017/0160141 A1 | 6/2017 | Yamanaka | |
| 2020/0202569 A1 | 6/2020 | Sandsten et al. | |

FOREIGN PATENT DOCUMENTS

| | | | | |
|---|---|---|---|---|
| CN | 104819779 | * | 4/2015 | |
| CN | 104819779 B | | 5/2018 | |
| CN | 111006775 A | | 4/2020 | |
| CN | 111693154 | * | 6/2020 | |
| CN | 111595462 A | | 8/2020 | |
| CN | 111693154 A | | 9/2020 | |
| EP | 1816455 A1 | | 8/2007 | |
| JP | 2001174329 A | | 6/2001 | |
| JP | 2005519266 A | | 6/2005 | |
| JP | 2008145133 A | | 6/2008 | |
| JP | 2008185465 A | | 8/2008 | |
| JP | 2014185860 A | | 10/2014 | |
| JP | 201514509 A | | 1/2015 | |
| JP | 2017126812 | * | 7/2017 | ................ G01J 1/02 |
| JP | 2017126812 A | | 7/2017 | |
| JP | 2019213193 A | | 12/2019 | |
| KR | 101556926 B1 | | 9/2015 | |
| KR | 1020170014274 A | | 2/2017 | |
| KR | 101833365 B1 | | 4/2018 | |
| KR | 102064582 B1 | | 1/2020 | |

* cited by examiner

FIG. 5

APPARATUS, METHOD, AND COMPUTER-READABLE RECORDING MEDIUM FOR MEASURING TEMPERATURE OF OBJECT USING COMPENSATION OF BOARD TEMPERATURE

CROSS-REFERENCE TO RELATED APPLICATIONS

This application is the United States national phase of International Application No. PCT/KR2020/017957 filed Dec. 9, 2020, and claims priority to Korean Patent Application No. 10-2020-0170066 filed Dec. 8, 2020, the disclosures of which are hereby incorporated by reference in their entireties.

BACKGROUND OF THE INVENTION

Field of the Invention

The present disclosure relates to an apparatus, a method and a computer-readable medium for measuring a temperature of an object using a compensation of a board temperature.

Description of Related Art

A thermal imaging camera is the most widely known device that thermally images a surface of an object and measures temperature distribution thereof, due to advantages thereof such as high spatial resolution and temperature resolution, a non-contact method, and the like.

In order to measure a temperature of an object using such a thermal imaging camera, a curve of a temperature difference with respect to an output code difference is obtained before and after opening a shutter based on a temperature of the shutter, the obtained curve of the temperature difference with respect to the output code difference is approximated to a fitting function of a suitable order, and then the temperature of the object is measured by means of the fitting function.

According to such a prior art, in order to measure a temperature of an object, it is necessary to measure a temperature of a shutter. However, since it is substantially impossible to mount a temperature sensor on the shutter, a temperature measured by means of a temperature sensor mounted on a board is taken as being a temperature of the shutter.

However, there is a difference between the temperature of the board and an actual temperature of the shutter, resulting in a problem in which a precision is degraded in a case of measuring a body temperature to be measured with a high accuracy, in particular, 0.5 degree or less.

As a related art, there is Korean Patent No. 2064582 ('APPARATUS AND METHOD OF MEASURING TEMPERATURE USING THERMAL IMAGING CAMERA AND COMPUTER READABLE MEDIUM, registered on Jan. 3, 2020).

SUMMARY OF THE INVENTION

Technical Problem

According to an embodiment of the present disclosure, an apparatus, a method and a computer-readable medium for measuring a temperature of an object using a compensation of a board temperature, which can obtain the temperature of the object with high accuracy without a shutter.

Solution to Problem

According to a first aspect of the present disclosure, a temperature measurement apparatus for measuring a temperature of an object using a compensation of a board temperature, comprises: an infrared sensor module for providing an output voltage due to infrared radiated by the object; a board temperature compensation module for compensating the provided output voltage with an output voltage at a reference temperature of a board, by using a first function of the output voltage with respect to a temperature of the board obtained at a reference temperature of a black body; and a calculation module for obtaining the temperature of the object from the compensated output voltage, by using a second function of a temperature of the black body with respect to the output voltage obtained at a reference temperature of the board.

According to a second aspect of the present disclosure, a temperature measurement method for measuring a temperature of an object using a compensation of a board temperature, comprising: a first step of, by an infrared sensor module, providing an output voltage due to infrared radiated by the object; a second step of, by a board temperature compensation module, compensating the provided output voltage with an output voltage at a reference temperature of a board, by using a first function of the output voltage with respect to a temperature of the board obtained at a reference temperature of a black body; and a third step of, by a calculation module, obtaining the temperature of the object from the compensated output voltage, by using a second function of a temperature of the black body with respect to the output voltage obtained at a reference temperature of the board.

According to a second aspect of the present disclosure, a computer-readable recording medium, recording a program for executing the temperature measurement method on a computer, is provided.

Advantageous Effects of Invention

According to an aspect of the present disclosure, there is an advantage of obtaining a temperature of an object with high accuracy without a shutter, by compensating an output voltage provided by an infrared sensor module with an output voltage at a reference temperature of a board, and obtaining the temperature of the object from the compensated output voltage using a function of a temperature of a black body with respect to the output voltage.

DETAILED DESCRIPTION

Hereinafter, embodiments in the present disclosure will be described hereinafter with reference to the accompanying drawings. The disclosure may, however, be modified in many different forms and should not be construed as being limited to the specific embodiments set forth hereinafter. In the drawings, the shapes and dimensions of elements may be exaggerated for clarity, and the same reference numerals will be used throughout to designate the same or like elements.

Figure 1:
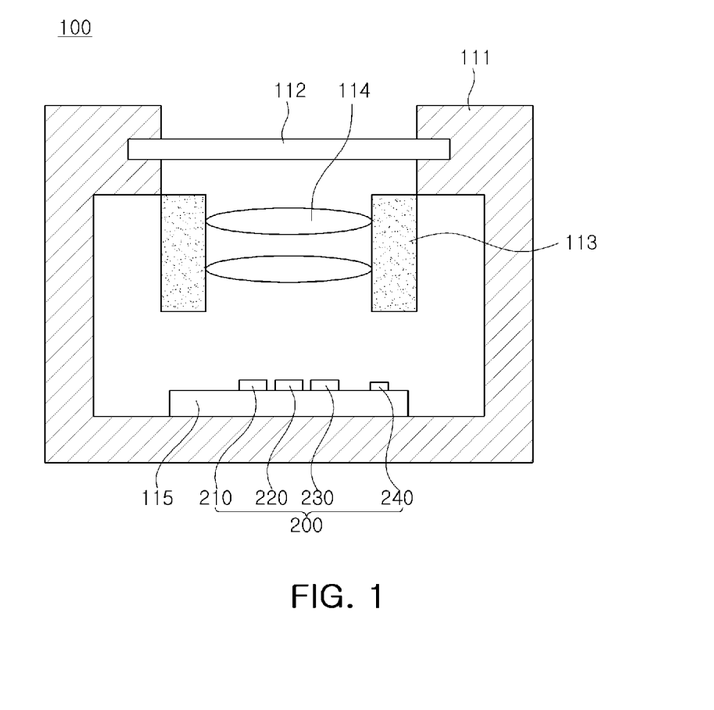
FIG. 1 is a view illustrating a thermal imaging camera comprising a temperature measurement apparatus according to an embodiment of the present disclosure.

FIG. 1 is a view illustrating a thermal imaging camera 100 comprising a temperature measurement apparatus according to an embodiment of the present disclosure.

As shown in FIG. 1, a thermal imaging camera 100 may include a housing 111, an IR window 112 provided on an upper portion of the housing 111, a barrel 113, a plurality of lenses 114 provided inside the barrel 113, a board 115, and a temperature measurement apparatus 200 provided on the board 115, and the temperature measurement apparatus 200 may include an infrared sensor module 210, a board temperature compensation module 220, a calculation module 230 and a temperature sensor module 240. According to an embodiment of the present disclosure, note that the thermal imaging camera 100 is not provided with a separate shutter.

Specifically, the infrared sensor module 210 is a module for providing an output voltage due to infrared radiated by the object, and may include an infrared sensor, but is not limited thereto. Hereinafter, the infrared sensor module 210 is described with reference to FIG. 2.

Figure 2:
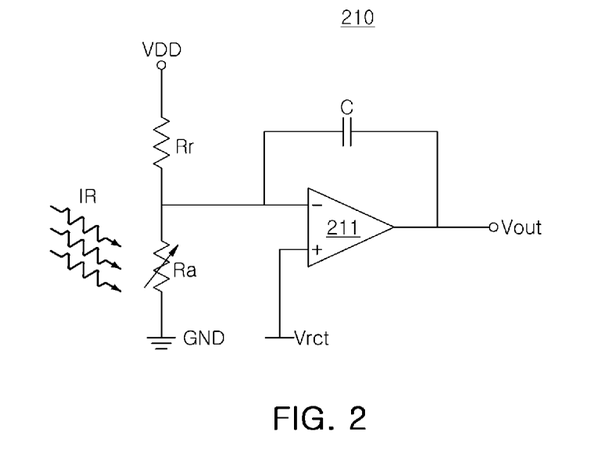
FIG. 2 is a circuit diagram of an infrared sensor module according to an embodiment of the present disclosure.

FIG. 2 is a circuit diagram of an infrared sensor module 210 according to an embodiment of the present disclosure.

As shown in FIG. 2, the infrared sensor module 210 may be configured to include a first bias power supply VDD for supplying a first bias voltage, a second bias power supply Vrct for supplying a second bias voltage having a magnitude less than a magnitude of the first bias voltage, a reference cell Rr having one end serially connected to the first bias power supply VDD, an active cell Ra having one end connected to the other end of the reference cell Rr and the other end connected to a ground GND, and an integrator 211 including a capacitor C for providing an output voltage obtained by integrating an increased amount of current flowing through the active cell Ra, wherein a negative terminal of the integrator 211 is connected to a connection node of the reference cell Rr and the active cell Ra, and a positive terminal of the integrator 211 is connected to the second bias power supply Vrct.

The first bias voltage and the second bias voltage described above have magnitudes causing the output voltage Vout to be predetermined voltages at a reference temperature Tpcb_ref of the board and a reference temperature Tb_ref of the black body. Furthermore, the magnitude of the second bias voltage described above is a half of the magnitude of the first bias power supply VDD, or the magnitude of the second bias power supply Vrct is a value within a certain range from a half of the magnitude of the first bias power supply VDD. The reason for applying bias power supplies having fixed magnitudes is for providing stable power supply to a sensor.

The reference cell Rr described above may have a certain resistance value, and the active cell Ra may be an element having a resistance value varying with incident infrared IR.

The integrator 211 described above may generate an output signal (for example, a voltage) by integrating an increased amount of current flowing through the active cell Ra as the resistance value of the active cell Ra decreases.

Specifically, the integrator 211 may have a connection structure in which the negative terminal is connected to the connection node of the reference cell Rr and the active cell Ra, the second bias power supply Vrct is applied to the positive terminal, and the capacitor C is connected between the negative terminal and an output terminal.

Referring to FIG. 2, when the infrared sensor is irradiated, the resistance value of the active cell Ra decreases, and the bias power supplies VDD and Vrct may be applied in order to read such a variation of the resistance value in a form of a voltage. The magnitudes of applied bias power supplies VDD and Vrct may use the values stored when obtaining a first function, as will be described below.

As the resistance value of the active cell Ra1 decreases, the current flowing through the active cell Ra1 increase, and the amount of the current flowing through the active cell Ra may be integrated by the integrator 211 during a certain time interval, thereby generating the output signal Vout.

In order to help the understating of the present disclosure, only one reference cell Rr and one active cell Ra are illustratively shown in FIG. 2. However, there may be at least two active cells Ra, and it will be apparent to those skilled that each of the active cells Ra may be connected to the reference cell Rr via a switch (not shown).

In the meantime, the board temperature compensation module 220 may compensate the output voltage Vout provided by the infrared sensor module 210 with an output voltage at the reference temperature Tpcb_ref of the board 115, by using a first function (please refer to Equation 1 below) of an output voltage Vout with respect to the temperature Tpcb of the board 115 obtained at a reference temperature Tb_ref of the black body.

In the meantime, the first function described above may be a function obtained by curve-fitting the output voltage Vout with respect to the temperature Tpcb of the board 115 measured in a state that the temperature of the black body (not shown) is fixed to the reference temperature Tb_ref of the black body.

Hereinafter, a process for obtaining the first function of the output voltage Vout with respect to the temperature Tpcb of the board will be described in detail.

First, in a state that the temperature Tpcb of the board 115 is maintained at the reference temperature Tpcb_ref (for example, 25° C.), after positioning a black body (not shown) having a reference temperature Tb_ref (for example, 40° C.) in front of the thermal imaging camera 100, the bias voltages VDD and Vcrt causing the output voltage Vout to be a desired voltage, for example, 0.9 V, are stored, while varying the bias voltages VDD and Vcrt.

Then, the stored bias voltages VDD and Vcrt are applied, and the output voltages Vout, for example Vout1, Vout2 and Vout3, are stored while varying the temperature Tpcb of the board 115 to Tpcb1, Tpcb2 and Tpcb3, respectively, in a state that the black body (not shown) having the reference temperature Tb_ref (for example, 40° C.) is positioned in front of the thermal imaging camera 100.

Then, the first function of the output voltage Vout with respect to the temperature Tpcb of the board may be obtained by curve-fitting the temperatures of the board and the output voltages (curve-fitting Tpcb1-Vout1, Tpcb2-Vout2 and Tpcb3-Vout3).

Figure 3:
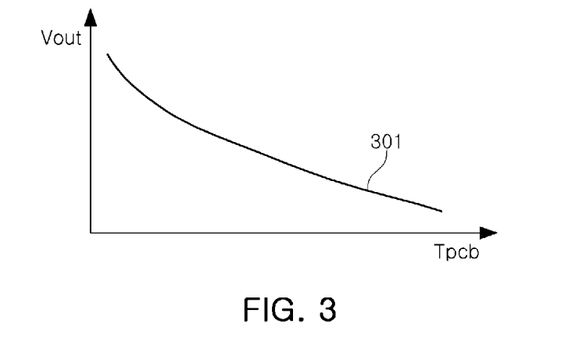
FIG. 3 is a view showing a curve obtained by curve-fitting an output voltage with respect to a temperature of the board obtained at a reference temperature of a black body according to an embodiment of the present disclosure.

Note that the first function, for example, may be a quadric function as shown the following Equation 1, but is not necessarily limited to a quadric function. A curve 301 obtained according to the above may be shown as shown in FIG. 3.

$$Vout(Tpcb) = 2.3125 + 0.05 \times Tpcb - 0.0025 \times Tpcb^2 \quad \text{[Equation 1]}$$

where Vout(Tpcb) may denote the output voltage when the temperature of the board is Tpcb, and Tpcb may denote the temperature of the board. Equation 1 described above may be obtained when the temperature Tb of the black body is the reference temperature Tb_ref.

More specifically, the board temperature compensation module 220 may compensate the provided output voltage Vout with an output voltage at the reference temperature Tpcb_ref of the board 115, by subtracting a variation of the output voltage according to a difference between the temperature Tpcb of the board 115 and the reference temperature Tpcb_ref of the board 115 from the output voltage Vout provided by the infrared sensor module 210, according to the following Equation 2.

$$Voutc = Vout - (Vout(Tpcb) - Vout(Tpcb\_ref)) \quad \text{[Equation 2]}$$

where Voutc denotes the compensated output voltage, Vout denotes the output voltage provided by the infrared sensor module in a state that the object is positioned, and Vout(Tpcb) and Vout(Tpcb_ref) are the output voltages obtained by putting Tpcb and Tpcb_ref to Equation 1 described above. The aforementioned variation of the current is (Vout(Tpcb)−Vout(Tpcb_ref)).

In the meantime, the calculation module 230 may obtain the temperature of the object from the compensated output voltage Voutc compensated by the board temperature compensation module 22012, by using a second function (please refer to Equation 3 below) of the temperature Tb of the black body with respect to the output voltage Vout obtained at the reference temperature Tpcb_ref of the board 115.

That is, the calculation module 230 may obtain the temperature of the object by putting the compensated output voltage Voutc to Vout, the variable of the second function (please refer to Equation 3 below) of the temperature Tb of the black body with respect to the output voltage Vout obtained at the reference temperature Tpcb_ref of the board 115.

The second function describe above may be a function obtained by curve-fitting the temperature Tpcb of the black body with respect to the output voltage Vout provided in a state that the temperature of the board 115 is fixed to the reference temperature Tpcb_ref.

Hereinafter, a process for obtaining the second function of the temperature of the black body with respect to the output voltage will be described in detail.

First, the bias voltages VDD and Vrct stored above are applied to the infrared sensor module 210, and the output voltages Vout, for example Vout1, Vout2 and Vout3, are stored while varying the temperature Tb of the black body positioned in front of the thermal imaging camera 100 to Tb1, Tb2 and Tb3, respectively, in a state of maintaining the temperature Tpcb of the board 115 at the reference temperature Tpcb_ref (for example, 25° C.)

Then, the second function may be obtained by curve-fitting the temperatures Tb of the black body with respect to the output voltages Vout (curve-fitting Vout1-Tb1, Vout2-Tb2 and Vout3-Tb3).

Figure 4:
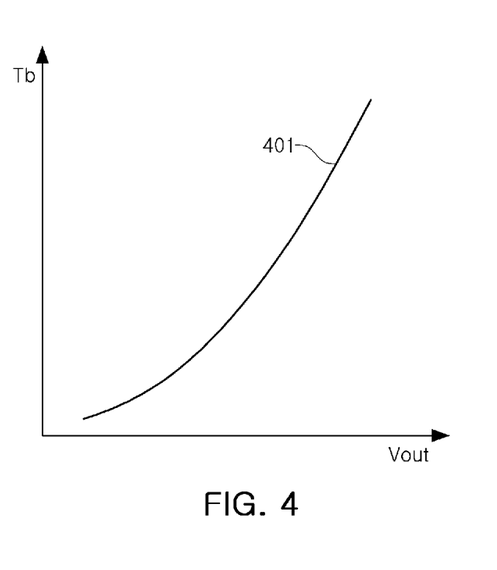
FIG. 4 is a view showing a curve obtained by curve-fitting a temperature of a black body with respect to an output voltage obtained at a reference temperature of the board according to an embodiment of the present disclosure.

Note that the second function, for example, may be a quadric function as shown the following Equation 3, but is not necessarily limited to a quadric function. A curve 401 obtained according to the above may be shown as shown in FIG. 4.

$$Tb(Vout) = -180 + 176.667 \times Vout - 33.3333 \times Vout^2 \quad \text{[Equation 3]}$$

where Tb(Vout) may denote the temperature of the black body, and Vout may denote the output voltage.

In the meantime, the temperature sensor module 240 may be provided on the board 115, and measure the temperature of the board 115. The measured temperature of the board 115 may be communicated to the board temperature compensation module 220 and the calculation module 230 described above and may be used to obtain the functions or measuring the temperature of the object.

As described above, according to an embodiment of the present disclosure, there is an advantage of obtaining a temperature of an object with high accuracy without a shutter, by compensating an output voltage provided by an infrared sensor module with an output voltage at a reference temperature of the board 115, and obtaining the temperature of the object from the compensated output voltage using a function of a temperature of a black body with respect to the output voltage.

Figure 5:
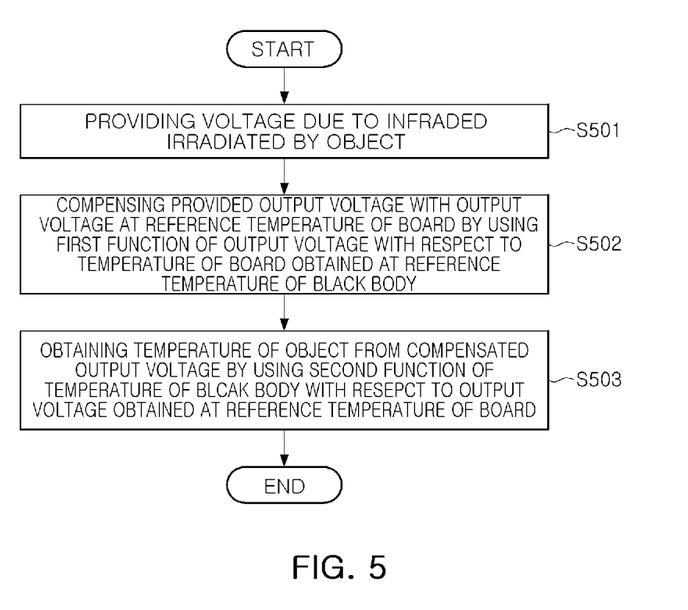
FIG. 5 is a flow chart describing a method for measuring a temperature of an object using a compensation of a board temperature according to an embodiment of the present disclosure.

In the meantime, FIG. 5 is a flow chart describing a method for measuring a temperature of an object using a temperature compensation of a board 115.

Hereinafter, a method for measuring a temperature of an object using a temperature compensation of a board 115 according to an embodiment of the present disclosure will be described with reference to FIGS. 1 to 5. However, for simplicity of the present disclosure, the descriptions overlapping with those described in FIGS. 1 to 4 will be omitted.

Firstly, as shown in FIGS. 1 to 5, the infrared sensor module 210 may provide an output voltage due to infrared radiated by the object (S501). The provided output voltage may be communicated to the board temperature compensation module 220.

Next, the board temperature compensation module 220 may compensate the output voltage Vout provided by the infrared sensor module 210 with an output voltage at a reference temperature Tpcb_ref of the board 115, by using the first function of an output voltage Vout with respect to the temperature Tpcb of the board 115 obtained at the reference temperature Tb_ref of a black body (S502).

In the meantime, the first function described above may be a function obtained by curve-fitting the output voltage Vout with respect to the temperature Tpcb of the board 115 measured in a state that the temperature of the black body (not shown) is fixed to the reference temperature Tb_ref of the black body, and a process of obtaining the first function of the output voltage with respect to the temperature Tpcb of the board is as described above.

Finally, the calculation module 230 may obtain the temperature of the object from the output voltage Voutc compensated by the board temperature compensation module 220, by using the second function of the temperature Tb of the black body with respect to the output voltage Vout obtained at the reference temperature Tpcb_ref of the board 115 (S503).

That is, the calculation module 230 may obtain the temperature of the object by putting the compensated output voltage Voutc to Vout, the variable of the second function of the temperature Tb of the black body with respect to the output voltage Vout obtained at the reference temperature Tpcb_ref of the board 115.

The second function describe above may be a function obtained by curve-fitting the temperature Tb of the black body with respect to the output voltage Vout provided in a state that the temperature of the board 115 is fixed to the reference temperature Tpcb_ref, and a process of obtaining the second function of the temperature of the black body with respect to the output voltage is as described above.

According to an aspect of the present disclosure, there is an advantage of obtaining a temperature of an object with high accuracy without a shutter, by compensating an output voltage provided by an infrared sensor module with an output voltage at a reference temperature of a board, and obtaining the temperature of the object from the compensated output voltage using a function of a temperature of a black body with respect to the output voltage.

The temperature measurement apparatus for measuring a temperature of an object using a compensation of a board temperature according to an embodiment of the present disclosure described above may be manufactured as a program to be executed in a computer and stored in a computer-readable recording medium. As examples of computer-readable recording media, ROM, RAM, CD-ROM, a magnetic tape, a floppy disk, an optical data storage device, and the like may be included. In addition, the computer-readable recording medium may be distributed over a computer system connected through a network, so that computer-readable codes may be stored and executed in a distributed manner. Functional programs, codes, and code segments for implementing the method may be easily inferred by programmers in the art to which the present disclosure belongs.

In addition, in describing the present disclosure, '~module' may be implemented by various methods, for example, a processor, program commands performed by the processor, a software module, a microcode, a computer program product, a logic circuit, an application-specific integrated circuit, a firmware, and the like.

While example embodiments have been shown and described above, it will be apparent to those skilled in the art that modifications and variations could be made without departing from the scope of the present disclosure as defined by the appended claims.

The invention claimed is:

1. A temperature measurement apparatus for measuring a temperature of an object using a compensation of a board temperature, comprising:
   an infrared sensor module for providing an output voltage due to infrared radiated by the object;
   a board temperature compensation module for compensating the provided output voltage with an output voltage at a reference temperature of a board, by using a first function of the output voltage with respect to a temperature of the board obtained at a reference temperature of a black body; and
   a calculation module for obtaining the temperature of the object from the compensated output voltage, by using a second function of a temperature of the black body with respect to the output voltage obtained at the reference temperature of the board.

2. The temperature measurement apparatus of claim 1, further comprising:
   a temperature sensor module for measuring the temperature of the board on which the infrared sensor module is mounted.

3. The temperature measurement apparatus of claim 2 wherein the board temperature compensation module compensates the provided output voltage with the output voltage at the reference temperature of the board using the first function, by subtracting a variation of the output voltage according to a difference between the measured temperature of the board and the reference temperature of the board from the provided output voltage.

4. The temperature measurement apparatus of claim 1, wherein the first function is a function obtained by curve-fitting the output voltage with respect to the temperature of the board measured in a state in which the temperature of the black body is fixed to the reference temperature of the black body.

5. The temperature measurement apparatus of claim 1 wherein the second function is a function obtained by curve-fitting the output voltage with respect to the temperature of the board measured in a state in which the temperature of the board is fixed to the reference temperature of the board.

6. The temperature measurement apparatus of claim 1, wherein the infrared sensor module comprises:
   a first bias power supply for supplying a first bias voltage;
   a second bias power supply for supplying a second bias voltage having a magnitude less than the magnitude of the first bias voltage;
   a reference cell having one end serially connected to the first bias power supply;
   an active cell having one end connected to the other end of the reference cell and the other end connected to a ground; and
   an integrator for providing the output voltage obtained by integrating an increased amount of current flowing through the active cell, wherein a negative terminal of the integrator is connected to a connection node of the reference cell and the active cell, and a positive terminal of the integrator is connected to the second bias power supply.

7. The temperature measurement apparatus of claim 6, wherein the first bias voltage and the second bias voltage have magnitudes causing the output voltage to be predetermined values at the reference temperature of the board and the reference temperature of the black body.

8. A temperature measurement method for measuring a temperature of an object using a compensation of a board temperature, comprising:
   a first step of, by an infrared sensor module, providing an output voltage due to infrared radiated by the object;
   a second step of, by a board temperature compensation module, compensating the provided output voltage with an output voltage at a reference temperature of a board, by using a first function of the output voltage with respect to a temperature of the board obtained at a reference temperature of a black body; and
   a third step of, by a calculation module, obtaining the temperature of the object from the compensated output voltage, by using a second function of a temperature of the black body with respect to the output voltage obtained at a reference temperature of the board.

9. A computer-readable recording medium, recording a program for executing the temperature measurement method of claim 8.

* * * * *